(12) United States Patent
Iimura

(10) Patent No.: US 7,980,691 B2
(45) Date of Patent: Jul. 19, 2011

(54) FIXING MECHANISM OF GUT FOR HALF RIM

(75) Inventor: Yuichi Iimura, Tokyo (JP)

(73) Assignee: Four Nines, Inc., Tokyo (JP)

( * ) Notice: Subject to any disclaimer, the term of this patent is extended or adjusted under 35 U.S.C. 154(b) by 0 days.

(21) Appl. No.: 12/656,916

(22) Filed: Feb. 19, 2010

(65) Prior Publication Data

US 2010/0231848 A1  Sep. 16, 2010

(30) Foreign Application Priority Data

Mar. 10, 2009  (JP) .................................. 2009-056718

(51) Int. Cl.
  *G02C 1/04*  (2006.01)

(52) U.S. Cl. .......................... 351/103; 351/109; 351/140

(58) Field of Classification Search .......... 351/103–109, 351/140, 154
See application file for complete search history.

(56) References Cited

U.S. PATENT DOCUMENTS

| 2,516,549 A | * | 7/1950 | Chappell | ......................... | 351/92 |
| 4,371,238 A | | 2/1983 | Lhospice | | |
| 4,842,399 A | * | 6/1989 | Tsai | .............................. | 351/106 |

FOREIGN PATENT DOCUMENTS

| EP | 0027415 B1 | | 5/1983 | | |
| JP | 2004-271948 A | * | 9/2004 | ..................... | 351/103 |

* cited by examiner

*Primary Examiner* — Huy K Mai
(74) *Attorney, Agent, or Firm* — Bacon & Thomas, PLLC

(57) ABSTRACT

A fixing mechanism of a gut 6 holding a lens 20 onto a half rim 1 prevents the gut 6 from being cut off by a large force acting on a bent part of the gut 6. The fixing mechanism includes an attachment part 2 of the half rim 1, to which a part of the periphery of the lens 20 is held, the lens 20, and the gut 6 fixing the lens 20 to the attachment part 2 by pressing the periphery of the lens 20 and thereby pressing the lens 20 toward the attachment part 2. The fixing mechanism further includes holding members 8 and 11 holding each end of the gut 6 on the both sides of the attachment part 2 of the half rim 1, which holding members 8 and 11 are arranged in hollow parts 7 and 10, respectively, formed on both the side parts of the attachment part 2 of the half rim 1.

7 Claims, 4 Drawing Sheets

FIXING MECHANISM OF GUT FOR HALF RIM

This application claims the benefit of Japanese Patent Application No. 2009-056718, filed Mar. 10, 2009, which is hereby incorporated by reference herein in its entirety.

BACKGROUND OF THE INVENTION

1. Field of the Invention

The present invention relates to a fixing mechanism of a gut for a half rim in glasses having the half rim, and more particularly to a fixing mechanism of a gut for a half rim capable of preventing the gut from being cut off over a long period.

2. Description of the Related Art

A gut has conventionally been used for fixing a lens in glasses having a half rim. Each of the attachment parts of the half rim, to which attachment parts both the lenses are attached, is connected with the gut, and each lens positioned between each of the attachment parts of the half rim and the gut is pressed to the corresponding attachment part of the half rim by the corresponding gut to be fixed thereto. In this case, the connection between the half rim and the gut is made by making a hole at each of the ends of the attachment part into a periphery direction, and by inserting both the ends of the gut into both the holes with the ends turned therein lest the gut should shift, to fix the gut (see, for example, Japanese Patent Application Laid-Open Publication No. Hei 10-10475).

By the conventional fixing mechanism of a gut in a half rim, a part of the gut positioned in a hole formed in the half rim is sometimes cut off to be damaged during being fixed because the part wears, and the frequency of this damage in the half rim made of a metal is higher than that of the half rim made of a resin.

BRIEF SUMMARY OF THE INVENTION

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

The present invention has been made in view of the conventional problem, and aims at providing a fixing mechanism of a gut for a half rim enabling the gut connected to the half rim to surely fix a lens without fracturing over a long time.

In order to achieve the object, the present invention adopts the following means.

That is, the fixing mechanism of a gut for a half rim includes: an attachment part of the half rim, the attachment part holding a part of a periphery of a lens; the lens; the gut fixing the lens to the attachment part by pressing the periphery of the lens toward the attachment part; and holding members provided on both ends of the attachment part of the half rim for holding ends of the gut, respectively, the holding members arranged in hollow parts, respectively, formed on both the ends of the attachment part of the half rim, respectively.

According to the fixing mechanism of a gut for a half rim of the present invention, it becomes possible to sandwiching the lens between the half rim and the gut to fix the lens, and the ends of the gut are held by the holding members.

Another aspect of the invention is a fixing mechanism of a gut for a half rim wherein the half rim is made of a resin.

According to the fixing mechanism of a gut for a half rim, the half rim does not touch the gut directly. Moreover, because the half rim and the holding members can be displaced from each other and the holding members are made of a resin, the gut does not wear and no large forces act on the bent corner parts of the gut.

A further aspect of the invention is a fixing mechanism of a gut for a half rim wherein the half rim is made of a metal.

According to the fixing mechanism of a gut for a half rim of the present invention, the half rim does not touch the gut directly. Moreover, because the half rim and the holding members can be displaced from each other and the gut and the holding members cannot be displaced from each other, no large forces act on the bent corner parts of the gut.

As described above, according to the fixing mechanism of a gut for a half rim of the present invention, the holding members are arranged in the hollow parts formed in the half rim made of a resin or a metal, and the ends of the gut are held by the holding members, respectively. Consequently, the gut does not touch the half rim, and touches the holding members. Thereby, the gut is not rubbed with the half rim, and no apprehensions for damage exist over a long term.

BRIEF DESCRIPTION OF THE SEVERAL VIEWS OF THE DRAWINGS

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE PREFERRED EMBODIMENTS

In the following, a preferred embodiment of the present invention will be described with reference to the attached drawings.

Figure 1:
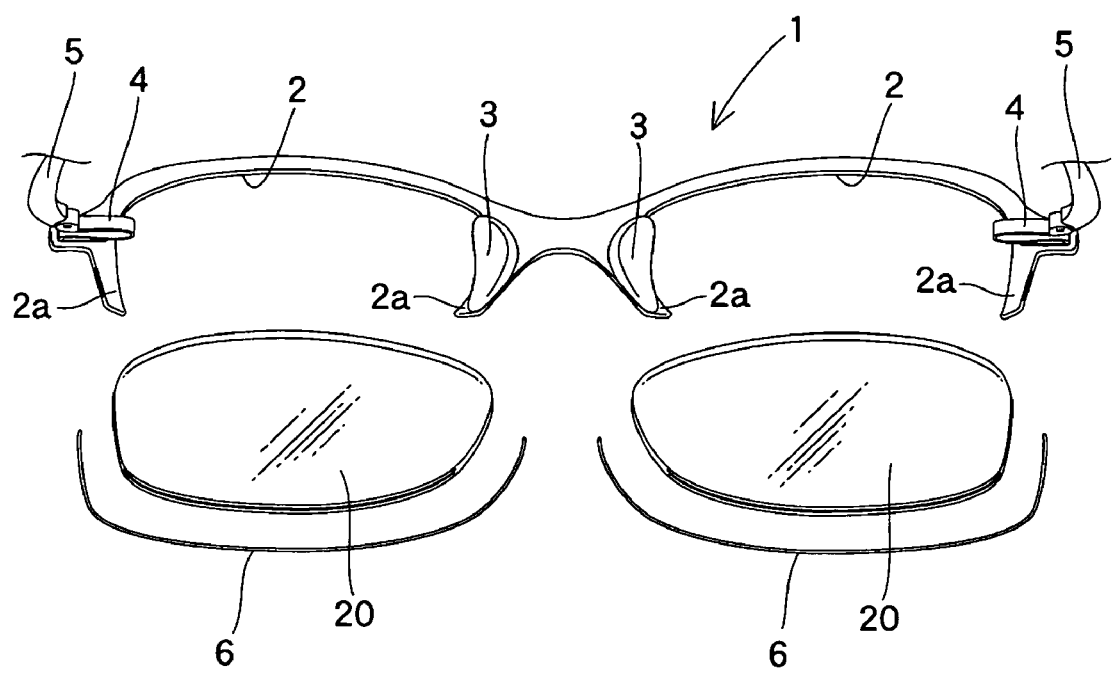
FIG. 1 is an exploded front view of a half rim, to both the ends of which temples are connected, lenses and guts.
Figure 2:
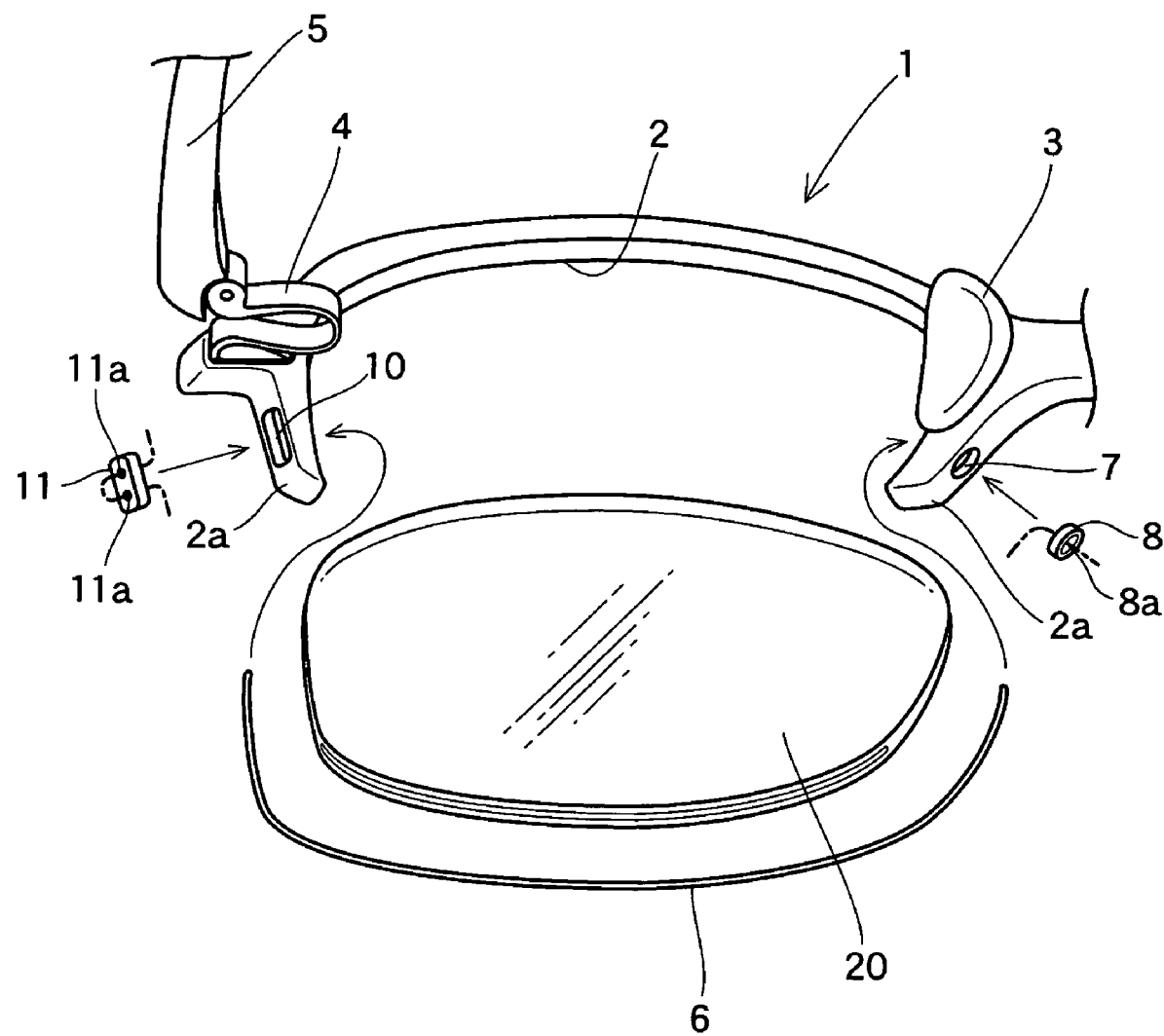
FIG. 2 is an enlarged view of the half rim, one of the temples, one of the lenses, and one of the guts of FIG. 1, and holding members.
Figure 3:
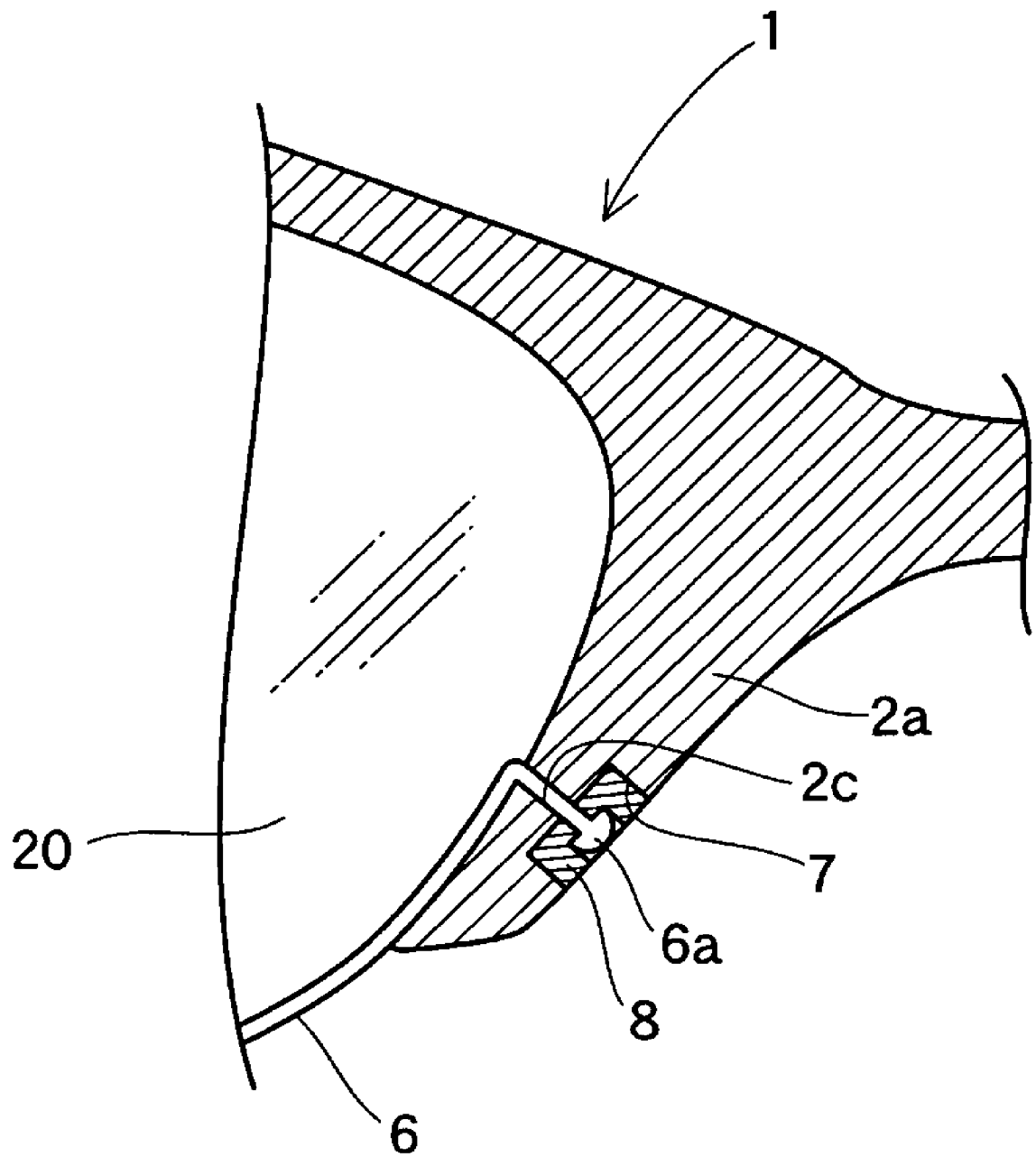
FIG. 3 is a sectional view showing the connection state of the half rim and one of the guts at one end of the half rim.
Figure 4:
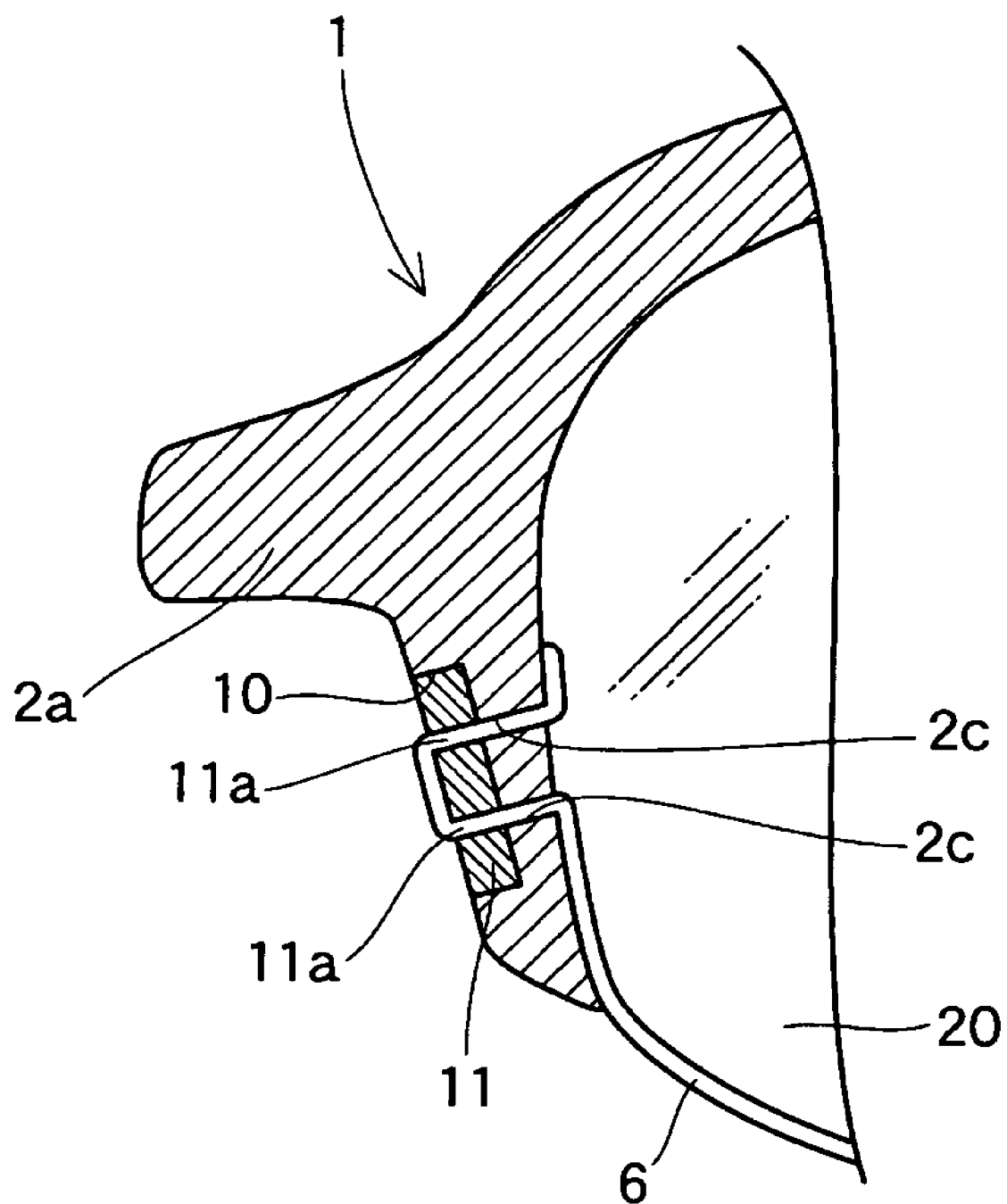
FIG. 4 is a sectional view showing the connection state of the half rim and the gut at the other end of the half rim.

FIGS. 1-4 show an embodiment of the fixing mechanism of a gut for a half rim according to the present invention. FIG. 1 is an exploded front view of the half rim, to both the ends of which temples are connected, lenses and the guts; FIG. 2 is an exploded enlarged view showing the half rim, one of the temples, one of the lenses, and one of the guts of FIG. 1, and further holding members positioned in hollow parts formed in the half rim; FIG. 3 is a sectional view showing the connection state of the half rim and one of the guts at one attachment part of the half rim; and FIG. 4 is a sectional view showing the connection state of the half rim and the gut at the other attachment part of the half rim.

As shown in FIG. 1, a half rim 1 including attachment parts 2 supporting the upper half parts of both lenses 20 is provided with nose pads 3 touching the nose of a user at the central part (inner ends) of the half rim 1, and temples 5 are connected to both the outer ends of the half rim 1, respectively, with armors 4 put between them.

Then, guts 6 pressing the lower half parts of the lenses 20 and sandwiching the lenses 20 between two supporting parts 2a of each of the attachment parts 2 of the half rim 1, respectively, are attached to the supporting parts 2a of the attachment parts 2 at the positions of both the ends of each of the lenses 20.

As shown in FIG. 2, each of the lenses 20 is worked to form a shape agreeing with each of the attachment parts 2 of the half rim 1, and each of the nose pads 3 is attached to the half rim 1 so as to be positioned on the inside of the lens 20. Moreover, the temples 5 are attached to both the ends of the half rim 1 with armors 4 severally put between them.

Then, a hollow part 7 is formed on the inner side of each of the attachment parts 2 of the half rim 1, and a ring-shaped holding member 8 capable of being positioned in the hollow part 7 is situated in the hollow part 7. Each of the guts 6 can be inserted into a hole 8a of the holding member 8.

On the other hand, a long hole-shaped hollow part 10 directed to the peripheral direction of one of the lenses 20 is formed in the supporting part 2a of the half rim 1 on each of the outer ends thereof, and an oblong holding member 11 capable of being positioned in the hollow part 10 is situated in the hollow part 10. Two holes 11a directed to the peripheral direction of the lens 20 are formed in the holding member 11, and the gut 6 is made to be capable of being inserted into the holes 11a of the holding member 11.

Each of the relations among the supporting parts 2a on the inner ends of the half rime 1, structured as above, the lenses 20, the guts 6, and the ring-shaped holding members 8 is made to be shown in FIG. 3.

As shown in FIG. 3, the gut 6 can be inserted into the hole 8a of the ring-shaped holding member 8 capable of being positioned in the hollow part 7 formed in the supporting part 2a, an enlarged part 6a formed at an end of the gut 6 is positioned in a hollow of a path continuing to the hole 8a, and the enlarged part 6a is configured to be housed in the holding member 8. Moreover, an insertion hole 2c for the gut 6 is formed in a part of the supporting part 2a of the attachment part 2 of the half rim 1, into which supporting part 2a the holding member 8 is inserted. The insertion hole 2c is formed so as to agree with the hole 8a of the holding member 8.

Moreover, each of the relations among the supporting parts 2a of the attachment parts 2 on the outer ends of the half rime 1, the lenses 20, the guts 6, and the oblong holding members 11 is made to be shown in FIG. 4. As shown in FIG. 4, the two holes 11a directed to the peripheral direction of the lens 20 are formed in the oblong holding member 11, and the gut 6 can be inserted into the holes 11a. The hollow part 10, in which the holding member 11 can be housed, is formed in the supporting part 2a, and the insertion holes 2c for the gut 6 are formed in two parts of the supporting part 2a which parts agree with the holes 11a of the holding member 11, respectively.

In the fixing mechanism of a gut for a half rim structured as above, first, one of the ends of each of the guts 6 is formed to be the enlarged part 6a in the state in which the end of the gut 6 is inserted into the hole 8a of one of the ring-shaped holding members 8. In this case, because the gut 6 is made of a resin, the enlarged part 6a can be formed by heating the end of the gut 6 to have a large diameter, and the enlarged part 6a can prevent the gut 6 from slipping out of the holding member 8.

After that, the gut 6 is inserted into the insertion hole 2c, formed in the supporting part 2a of one of the attachment parts 2, of the half rim 1 from the inside thereof, and the inserted end of the gut 6 is inserted into the holes 11a of one of the holding members 11 in order. Furthermore, the end of the gut 6 is positioned on the inside of the supporting part 2a, and the gut 6 is cut to have a length agreeing with the lower half part of one of the lenses 20. Then, the gut 6 is last pulled to fit the lens 20 to the attachment part 2 of the half rim 1 between the attachment parts 2a thereof to attach the lens 20 to the half rim 1. Then, the other side of the glasses is similarly assembled to be completed.

Incidentally, although the lenses 20 have been described to be attached to the half rim 1 on the lower side thereof in the present embodiment, the lenses 20 may be attached on the upper side of the half rim 1. In short, only the thing required for the present invention is to provide the holding members 8 and 11 to position the holding members 8 and 11 on the half rim 1, and thereby to hold the guts 6 with the holding members 8 and 11 in place of inserting the guts 6 into the holes of the half rim 1 directly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fixing mechanism of a gut for a half rim, comprising:
an attachment part of the half rim, the attachment part holding a part of a periphery of a lens;
the lens;
the gut fixing the lens to the attachment part by pressing the periphery of the lens toward the attachment part; and
holding members provided on both ends of the attachment part of the half rim for holding first and second ends of the gut, respectively, the holding members and the ends of the gut arranged in hollow parts, respectively, formed on both the ends of the attachment part of the half rim, respectively:
wherein each of the first and second ends of the gut are held by the respective holding member without contacting with the attachment part of the half rim.

2. The fixing mechanism according to claim 1, wherein the half rim is made of a resin.

3. The fixing mechanism according to claim 1, wherein the half rim is made of a metal.

4. The fixing mechanism according to claim 1, wherein at least one of the holding members has an oblong-shape.

5. The fixing mechanism according to claim 4, wherein at least one of the holding members has two holes for inserting the gut.

6. The fixing mechanism according to claim 1, wherein at least one of the holding members has a ring-shape.

7. The fixing mechanism according to claim 6, wherein at least one of the holding members has one hole for inserting the gut.

* * * * *